Figures 1, 2:
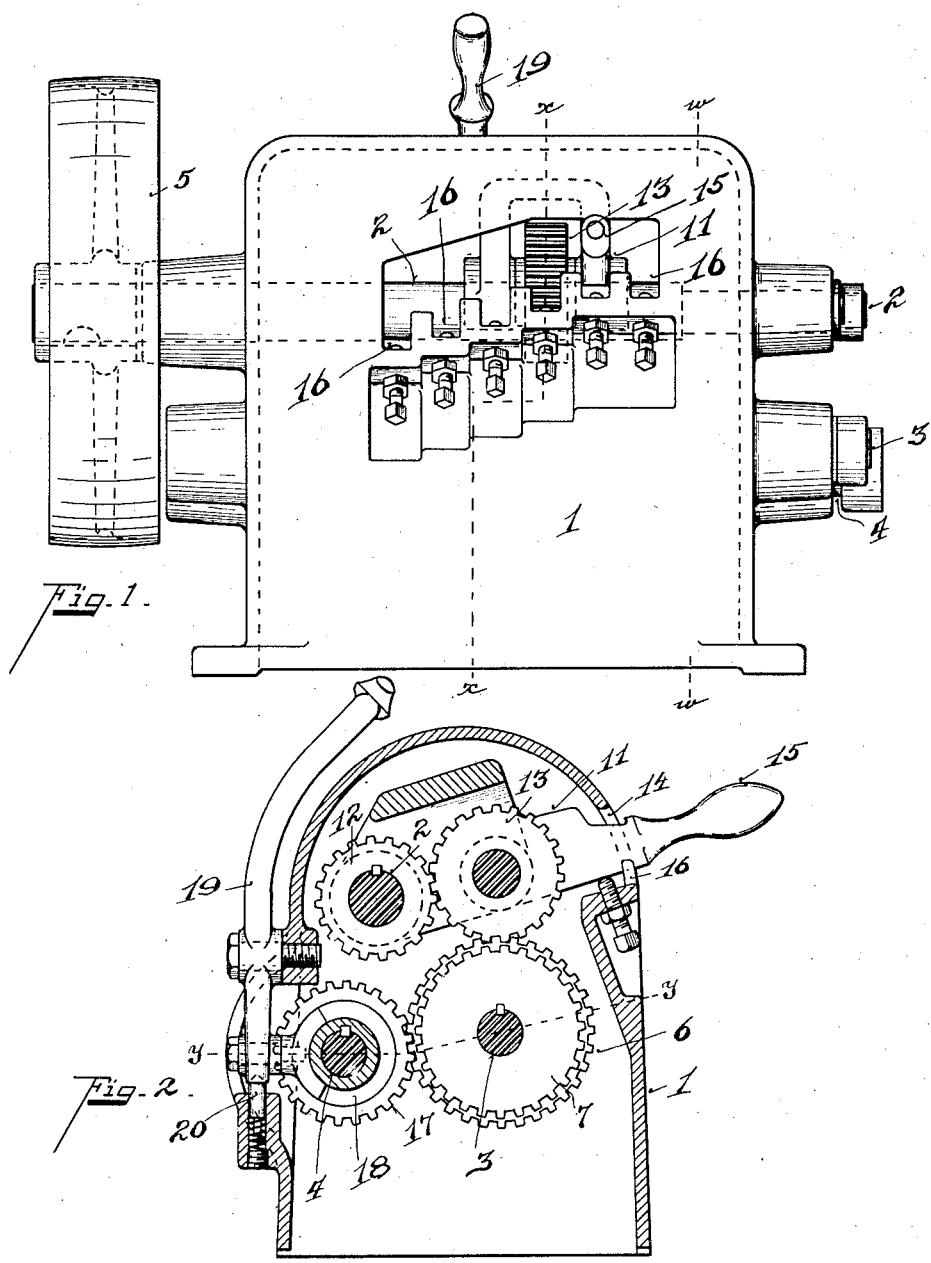

No. 820,984. PATENTED MAY 22, 1906.
H. McC. NORRIS.
VARIABLE SPEED MECHANISM.
APPLICATION FILED SEPT. 14, 1905.

3 SHEETS—SHEET 1.

Witnesses
Olive B. Kaiser
Luise Beck

Inventor
Henry McCoy Norris
By Wood & Wood
Attorneys

No. 820,984.
PATENTED MAY 22, 1906.
H. McC. NORRIS.
VARIABLE SPEED MECHANISM.
APPLICATION FILED SEPT. 14, 1905.
3 SHEETS—SHEET 2.
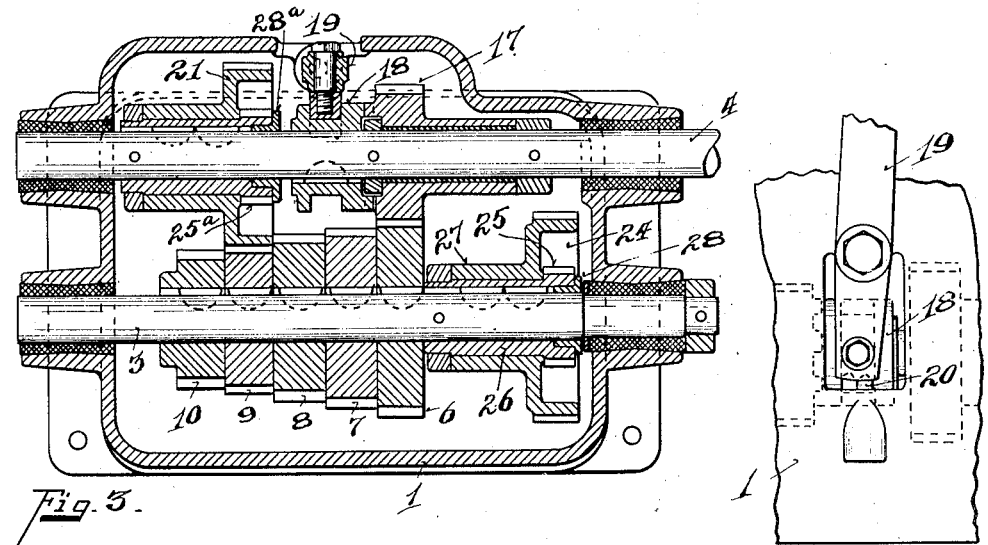
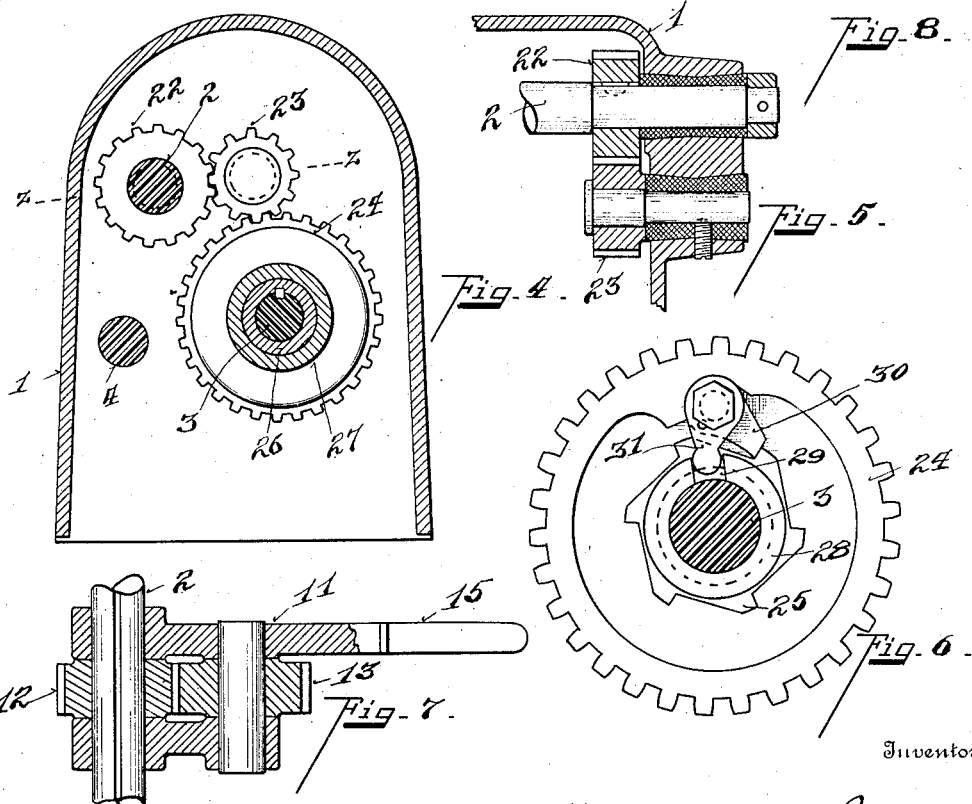
Witnesses
Olive B. Kaiser
Luise Beck
Inventor
Henry McCoy Norris
By Wood & Wood
Attorneys

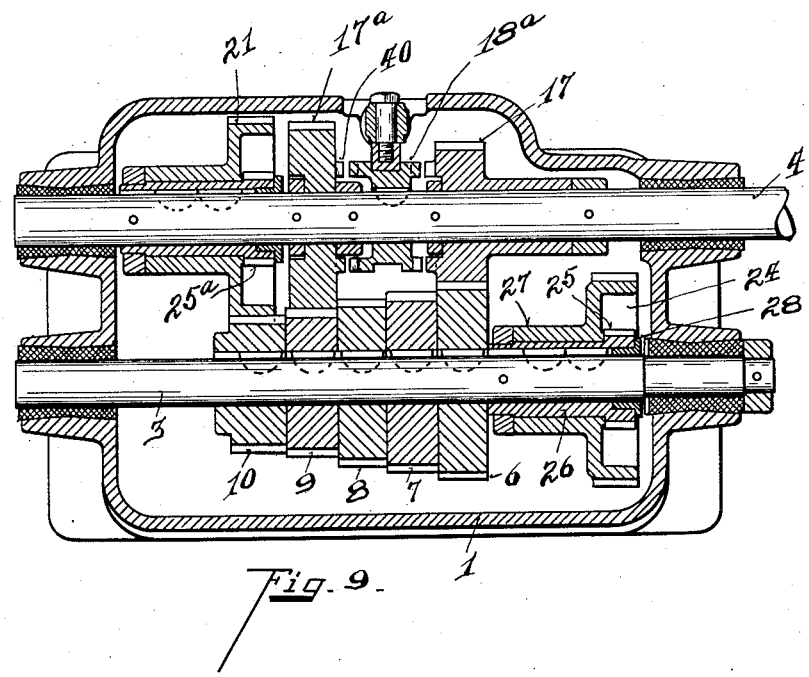

UNITED STATES PATENT OFFICE.

HENRY McCOY NORRIS, OF CINCINNATI, OHIO, ASSIGNOR TO THE PICKFORD DRILL & TOOL COMPANY, OF CINCINNATI, OHIO, A CORPORATION

VARIABLE-SPEED MECHANISM.

No. 820,984.  Specification of Letters Patent.  Patented May 22, 1906.

Application filed September 14, 1905. Serial No. 278,517.

*To all whom it may concern:*

Be it known that I, HENRY McCOY NORRIS, a citizen of the United States, residing at Cincinnati, in the county of Hamilton and State of Ohio, have invented certain new and useful Improvements in Variable-Speed Mechanism, of which the following is a specification.

My invention relates to a variable-speed mechanism, the principle of which is broadly covered by my prior patent, No. 787,392, of April 18, 1905; but my present improvement enables me to produce similar results with fewer parts, thereby producing a compact but ample range speed-box.

The features of my invention are more fully set forth in the description of the accompanying drawings, forming a part of this invention, in which—

Figure 1 is a front elevation of my improved speed mechanism. Fig. 2 is a section on line $xx$, Fig. 1. Fig. 3 is a section on line $yy$, Fig. 2. Fig. 4 is a section on line $ww$, Fig. 1. Fig. 5 is a section on line $zz$, Fig. 4. Fig. 6 is an enlarged plan view of one of the gear-transmitters with pawl-and-ratchet mechanism in position. Fig. 7 is a detailed sectional view of the tumbler-shifting mechanism. Fig. 8 is a side elevation of the secondary clutch-shifting mechanism. Fig. 9 is a view similar to Fig. 3, showing a modification.

1 represents the casing, in which are journaled the driving or tumbler shaft 2, the gear-cone shaft 3, and the driven shaft 4.

5 represents the driving-wheel on shaft 2.

6 7 8 9 10 represent the usual cone of gear-wheels fixed to shaft 3.

11 represents a tumbler-lever sliding on shaft 2.

12 represents a pinion carried by the tumbler-lever 11, adapted to turn with and slide on shaft 2.

13 represents a tumbling-gear journaled on the outer end of lever 11, intermeshing constantly with pinion 12 and being adapted to engage selectively any one of the cone of gear-wheels as the tumbler-lever is manipulated. The front of the casing is provided with an opening 14, through which projects the lever-handle 15, the lower wall of the opening being preferably provided with the notches 16 for supporting said handle.

17 represents a gear-wheel loosely mounted on shaft 4 and intermeshing with one of the cone of gear-wheels on shaft 3, say, gear-wheel 6, of relatively greater diameter. Gear-wheel 17 is provided with a clutch-face to cooperate with the clutch member 18, slidably splined on shaft 4.

19 represents a lever-handle for throwing said clutch.

20 represents a lock for said clutch-shifting lever (see Figs. 2 and 8) consisting of an ordinary spring-actuated detent-pin engaging into notches in the end of the lever.

21 represents a gear-wheel loosely mounted relative to shaft 4 and adapted to be connected to and disconnected therefrom by automatic clutch mechanism which will be later described. Gear 21 is intermeshed with cone gear-wheel 9, which may be of the same or relative lesser diameter.

As in my said former patent, I provide a slowing-up device between shafts 2 and 3, whereby when the tumbler is raised shaft 3 is slowly driven by shaft 2, permitting the slowly-revolving gear-wheels to be safely intermeshed, and whereby when the intermesh is effected the slowing-up device is automatically thrown out of commission. This slowing-up device is the same in construction and operation as that shown, described, and claimed in my former patent. In brief, it consists of a gear-wheel 22, fixed on shaft 2, intermeshing with a gear-wheel 23, suitably journaled, which in turn intermeshes with a relatively larger gear-wheel 24, through which the shaft 3 passes.

25 represents a ratchet-wheel having a sleeve-hub 26, upon which is loosely journaled the sleeve-hub 27 of gear-wheel 24. Ratchet-wheel 25 is fixed to shaft 3.

28 represents a collar inserted between shaft 3 and the ratchet-wheel 25. Said collar is provided with a radial slot 29. Pivotally suspended from the rim of the gear-wheel 24 is a member having the pawl 30, adapted to engage the teeth of ratchet-wheel 25, and a stem 31, adapted to engage into the slot 29 of the collar 28. Whenever the tumbler is disengaged, the pawl 30 will engage the ratchet-teeth of wheel 25, as shown in Fig. 6, and gear-wheel 24 will be fixed to shaft 3. When the tumbler is engaged, shaft 3 will be driven at a faster rate of rotation than gear-wheel 24, and pawl 30 will be automatically lifted from engagement with the ratchet-wheel 25, gear 24 turning idly.

Gear-wheel 21 has a ratchet-wheel 25ª and collar 28ª with a slot similar to that shown in Fig. 6, and the gear-wheel has a pivotally-suspended pawl and stem corresponding to the similar parts shown in Fig. 6. The ratchet-wheel 25ª is fixed to shaft 4. Gear-wheel 21, however, differs from gear-wheel 24 in that it constitutes one of the train of the speed-changing gears.

In operation assume that the gear-wheel 17 is unclutched relative to shaft 4. Whenever the tumbler is raised, the shafts 3 and 4 will slowly rotate, being driven through the train of gears 22, 23, 24, 9, and 21 in the order named, gear-wheel 21 being clutched to shaft 4 by the mechanism corresponding with that shown in Fig. 6, and the tumbling-gear 13 may be safely intermeshed at low speed with any one of the gear-wheels of the cone on shaft 3. When such tumbler engagement takes place, the clutch mechanism connecting shaft 3 to gear-wheel 24 will be automatically unshifted, as previously explained, owing to the faster rotation of shaft 3 relative to gear-wheel 24; but as shaft 4 and gear-wheel 21 will still be rotating in unison the clutch mechanism between them will remain in connection, gear-wheel 17 rotating as an idler. If now the clutch 18 be shifted to fix gear-wheel 17 to shaft 4, shaft 4 will rotate relatively faster than gear-wheel 21, (gear-wheel 6 being larger than the intermeshing gear-wheel 17,) thus automatically unclutching the gear-wheel 21 from shaft 4.

The operation of the automatic clutches of gear-wheels 21 and 24 is practically identical. When the shaft rotates at approximately the same speed as the gear-wheel, they are automatically fixed to rotate in unison; but the relative speeding up of the shaft automatically unclutches the gear, which being positively driven rotates idly on the shaft. It is only necessary that the ratio of speed transmitted between gears 17 and 6 be higher than the ratio between gears 21 and 9.

The clutch members 17 and 18 are of the toothed or positive clutch order, and this type can be employed and operated while the mechanism is in motion by reason of the automatic clutch-shifting mechanism between shaft 4 and gear-wheel 21. This is a distinct advantage. In this arrangement it is obvious that one speed may be obtained while the tumbler is disengaged through the driven gear-wheels 22, 23, 24, 9, and 21, and by shifting clutch 18 a second speed may be obtained through the gear-wheels 22, 23, 24, 6, and 17. By throwing the tumbler into commission and by shifting clutch 18 ten more speed changes may be obtained, with five gear-wheels constituting the cone.

In the modification shown in Fig. 9 another loose gear 17ª has been added on shaft 4. It is provided with a clutch-member 40, coöperating with the shifting clutch 18ª. The shifting member 18ª being a double-face clutch in one direction of movement fixing gear 17 to shaft 4 and in the other direction of movement fixing gear 17ª to said shaft. Gear 21 in this form meshes with cone-gear 10, so as to provide greater space on shaft 4 for the shifting clutch 18. This form adds six more speeds to the box, the operation being the same as before described. Five of these speeds are obtained by fixing gear 17ª to shaft 4 and by shifting the tumbler into the step-gears. The sixth speed is obtained when the tumbler is disengaged, and shaft 4 is driven by the gears 22, 23, 24, 10, and 17ª. Thus with the simple arrangement and the few gears shown in Fig. 9 eighteen changes of speed can be obtained.

For brevity I have described the different diameter-gearing connecting shafts 2 and 3 as a "cone-and-tumbler gear system;" but it is not intended to limit the invention to a disposition of the different diameter-gears in the shape of a cone, as this arrangement is convenient, but not essentially functional. This arrangement is very compact, easily manipulated, gives an ample range of speed changes with comparatively few gears constituting the train, and each change of speed may be accomplished with perfect safety while the mechanism is in operation.

Having described my invention, I claim—

1. In a variable-speed device, a shaft, a cone of different diameter gear-wheels, means for selectively driving any one of said gear-wheels, a second shaft, a loose gear-wheel thereon intermeshed with a gear-wheel on the cone, a slidable clutch for fixing said loose gear-wheel to the second shaft, a second gear-wheel loose on the second shaft and intermeshed with one of said cone-gears, and an automatic clutch mechanism adapted to fix said second gear-wheel to said second shaft when the slidable clutch is disengaged and to automatically unclutch said second gear when the slidable clutch is engaged, substantially as described.

2. In a variable-speed device, a shaft, a cone of different diameter gear-wheels, means for selectively driving any one of said gear-wheels, a second shaft, a loose gear-wheel thereon intermeshing with a relatively larger gear-wheel of the cone, a slidable clutch for fixing said loose gear-wheel to the second shaft, a second gear-wheel loose on the second shaft and intermeshing with one of said cone-gears, and an automatic clutch mechanism adapted to fix said second gear-wheel to said second shaft when the slidable clutch is disengaged and to automatically unclutch said second gear when the slidable clutch is engaged, substantially as described.

3. In a variable-speed device, a first shaft, a tumbler-lever and gear-wheels thereon, a second shaft, a cone of gear-wheels thereon adapted to be selectively engaged by the tumbling-gear, a constantly-intermeshing pair of gear-wheels connecting said shafts, the driven gear-wheel being loose, and an automatic clutch adapted to fix said loose gear to its shaft when they approximate the same rate of rotation and to unclutch said gear from its shaft when said shaft is driven relatively faster, substantially as described.

4. In a variable-speed device, a first shaft, a tumbler-lever and gear-wheels thereon, a second shaft, a cone of gear-wheels thereon adapted to be selectively driven by the tumbling-gear, a constantly-intermeshing pair of gear-wheels connecting said shafts, the driven gear-wheel being loose, an automatic clutch adapted to fix said loose gear to its shaft when they approximate the same rate of rotation and to unclutch said gear from its shaft when said shaft is driven relatively faster, a third shaft, a loose gear-wheel thereon engaging one of the cone gear-wheels, a slidable clutch for fixing said loose gear-wheel to the third shaft, a second gear-wheel on said third shaft intermeshing with one of said cone of gear-wheels and an automatic clutch adapted to fix said second loose gear-wheel to said third shaft when the slidable clutch is out of commission and to be automatically released when the slidable clutch is engaged, substantially as described.

5. In a variable-speed device, a first shaft, a tumbler-lever and gear-wheels thereon, a second shaft, a cone of gear-wheels thereon adapted to be selectively driven by the tumbling-gear, a constantly-intermeshing pair of gear-wheels connecting said shafts, the driven gear-wheel being loose, an automatic clutch adapted to fix said loose gear to its shaft when they approximate the same rate of rotation and to unclutch said gear from its shaft when said shaft is driven relatively faster, a third shaft, a loose gear-wheel thereon engaging a relatively larger gear-wheel of the cone gear-wheels, a slidable clutch for fixing said loose gear-wheel to the third shaft, a second gear-wheel on said third shaft intermeshing with one of said cone of gear-wheels and an automatic clutch adapted to fix said second loose gear-wheel to said third shaft when the slidable clutch is out of commission and to be automatically released when the slidable clutch is engaged, substantially as described.

6. In a variable-speed device, a first and second shaft, a cone and tumbler gear system adapted to connect said shafts, an independent train of gears between said shafts comprising an automatic clutch adapted to be thrown in when the tumbler is disengaged, a third shaft, a pair of loose gears on said third shaft intermeshed with two of the cone-gears, a slidable clutch for one of said loose gears, and an automatic clutch for the second loose gear-wheel, adapted to be engaged when the slidable clutch is disengaged and vice versa, substantially as described.

7. In a variable-speed device, a first and second shaft, a cone and tumbler gear system adapted to connect said shafts in driving relation, a third shaft, a pair of loose gears on said third shaft intermeshing with two of said cone-gears, and having opposing clutch-faces, a double-face shifting coöperating clutch on the third shaft adapted to fix either of said gears to said third shaft, a third loose gear on said third shaft intermeshing with one of the cone-gears, and an automatic clutch adapted to fix said third gear to its shaft when said pair of loose gears are unclutched, and to be automatically unclutched when either of said pair of gears is clutched to said shaft, substantially as described.

8. In a variable-speed device, a first and second shaft, a cone and tumbler gear system adapted to connect said shafts in driving relation, a third shaft, a pair of loose gears on said third shaft intermeshing with two of said cone-gears, and having opposing clutch-faces, a double-face shifting coöperating clutch on the third shaft adapted to fix either of said gears to said third shaft, a third loose gear on said third shaft intermeshing with one of the cone-gears, and an automatic clutch adapted to fix said third gear to its shaft when said pair of loose gears are unclutched, and to be automatically unclutched when either of said pair of gears is clutched to said shaft, an independent train of gears connecting said first and second shafts, one of which is loose on its shaft, and an automatic clutch connecting said loose gear to its shaft and adapted to be automatically unclutched when said tumbler is engaged, substantially as described.

In testimony whereof I have hereunto set my hand.

HENRY McCOY NORRIS.

Witnesses:
 OLIVER B. KAISER,
 LOUISE BECK.